Feb. 16, 1943.  C. W. RUDOLPH  2,311,131
MEANS FOR CONTROLLING MOVEMENT OF TRUCKS INTO
AND FROM HEATED CHAMBERS OF FURNACES
Filed July 1, 1942  6 Sheets-Sheet 1

Inventor:
C. W. Rudolph.
By
Attorney.

Inventor:
C. W. Rudolph.
By
Attorney.

Patented Feb. 16, 1943

2,311,131

UNITED STATES PATENT OFFICE 2,311,131

MEANS FOR CONTROLLING MOVEMENT OF TRUCKS INTO AND FROM HEATED CHAMBERS OF FURNACES

Charles W. Rudolph, Chicago, Ill., assignor to Diamond Iron Works, Incorporated, Minneapolis, Minn.

Application July 1, 1942, Serial No. 449,368

11 Claims. (Cl. 104—50)

My invention relates to means for controlling movement of trucks into and from heated chambers of furnaces, so that they may be readily projected into the heated chamber and be withdrawn therefrom and may be moved to a suitable point for cooling of their load, removal of their load, and replaced with a new load.

In modern metal manufacturing of a highly varied assortment of different types of articles, heat treatment of the metals, particularly types of steels, is called for. This heat treatment consists in the introduction of the articles to be treated into a chamber of a furnace which is heated to a high temperature. The articles so introduced will be left subject to the heat of the chamber for a suitable time determined by experiment. At the end of that time it is necessary to withdraw the article from the heated chamber and continue or round out the treatment by different means of cooling. These means may be merely radiation, time cooling in the atmosphere, or may be by various forms of quenching, such as the subjecting of the heated articles to a spray of water or immersing them in a bath of oil.

In general the material-carrying truck, like the heated chamber of the furnace into which it is to be projected, is of very considerable length. It provides means for supporting the articles to be heat-treated and in practice where these articles are heavy, as is frequently or usually the case, the material-carrying truck is not only long but massive and heavy. This material-carrying truck not only must be introduced into and withdrawn from the heat chamber of the furnace, but it must be transferred to points where the articles carried thereby may cool and other material-carrying trucks loaded with fresh articles must be put in the furnace in place of it. In general the material-carrying truck runs on rails into and out of the furnace and away from the furnace to the extent desired and its rails are formed continuous with matching rails across a transfer truck ordinarily extending at right angles to the material-carrying truck so that the material-carrying truck can be moved to one side and a new loaded material-carrying truck be brought into position to be introduced into the heated chamber of the furnace.

In practice the movement of the material-carrying truck into and from the furnace is effected by means of a power-driven gear on the transfer truck meshing with a rack fast on the material-carrying truck. In the former practice it has been customary to have this rack rigidly connected with the material-carrying truck throughout its length and to have it extending from the ends thereof a considerable distance so that the gear on the transfer truck may move the material-carrying truck entirely into and entirely from the furnace and onto and from the transfer truck. This has presented a very serious problem for the reason that the projecting rack at the ends of the material-carrying truck have consumed much space on either side of the transfer truck as it moves back and forth in the plant and these projecting ends have been liable to strike articles causing injury to the truck and to the articles and may strike persons causing injury to such persons. Yet, despite these grave difficulties, to overcome the inertia of starting and stopping such heavy loads, it has been necessary to employ heavy and sufficiently strongly connected draft members such as heavy racks and the like operating in connection with driven gears.

It is also the practice in controlling and moving the material-carrying truck after it has been withdrawn from the furnace and before it is introduced into the furnace to place it upon a transfer truck. This transfer truck moves along a sunken track or track at the bottom of an elongated pit extending at right angles to the tracks entering the furnace and moving away from the pit on the opposite side thereof. It follows that when the transfer truck is properly positioned, a material-carrying truck thereon may be moved from it into a furnace, or from it to a track leading away from the furnace where cooling, storage, unloading and loading may take place. These transfer tracks cannot be placed close enough to a furnace or to the discharge track away from the furnace so that a rack normally contained within the limits of the material-carrying truck can operate with the driving gear on the transfer truck to move the material-carrying truck the necessary distances in either direction, and in the old practice the extension of the rack on either side has interfered very greatly with the movement of the transfer truck when the material-carrying truck is mounted thereon. It is therefore of the utmost advantage in the practice of my invention and an essential feature of it, that the rack extension be so mounted (shown herein as being upon a wheeled member) that it may be retracted to a position entirely within the limits of the frame of the material-carrying truck at both ends thereof. When this is done the transfer truck may readily and satisfactorily be moved along the transfer track without having any protruding members which might cause the serious mishaps above-noted.

It is a principal object of my invention therefore, to provide in association with the frame of the wheel-supported material-carrying truck, a draft appliance comprising a separate and smaller truck mounted upon the material-carrying truck and adapted to be moved in either direction on the body of the truck to project the draft or pusher means from and to and withdraw it within the limits of the article-carrying truck.

The supplemental means for projecting and retracting the material-carrying truck constitutes a floating truck within the body of the material-carrying truck, and it is a further object of my invention to have this floating truck carry a member which may be caused to engage with power-operated draft mechanism to propel the material-supporting truck in either direction.

It is a further object of my invention to provide means whereby the floating truck may be manually drawn out or returned to its position within the limits of the material-carrying truck where it can alternatively be connected with the driving means and moved to a position entirely away from the furnace door.

It is a further object of my invention to construct the floating truck member in relation to the frame of the material-carrying truck with means on each which may be caused to contact for making draft connection between the power means and the material-carrying truck.

The full objects and advantages of my invention will appear in connection with the description to be given in detail in the appended specification, and the novel features by which the aforesaid advantageous results are obtained will be particularly pointed out in the claims.

In the drawings illustrating an application of my invention in one form.

Figure 1:
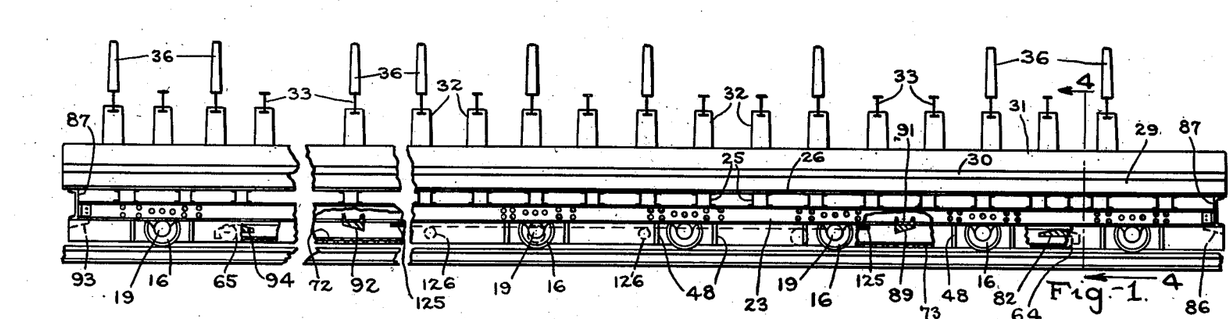
Fig. 1 is a side elevation view of the truck mounted on its rails as the same appears outside of the furnace.
Figure 4:
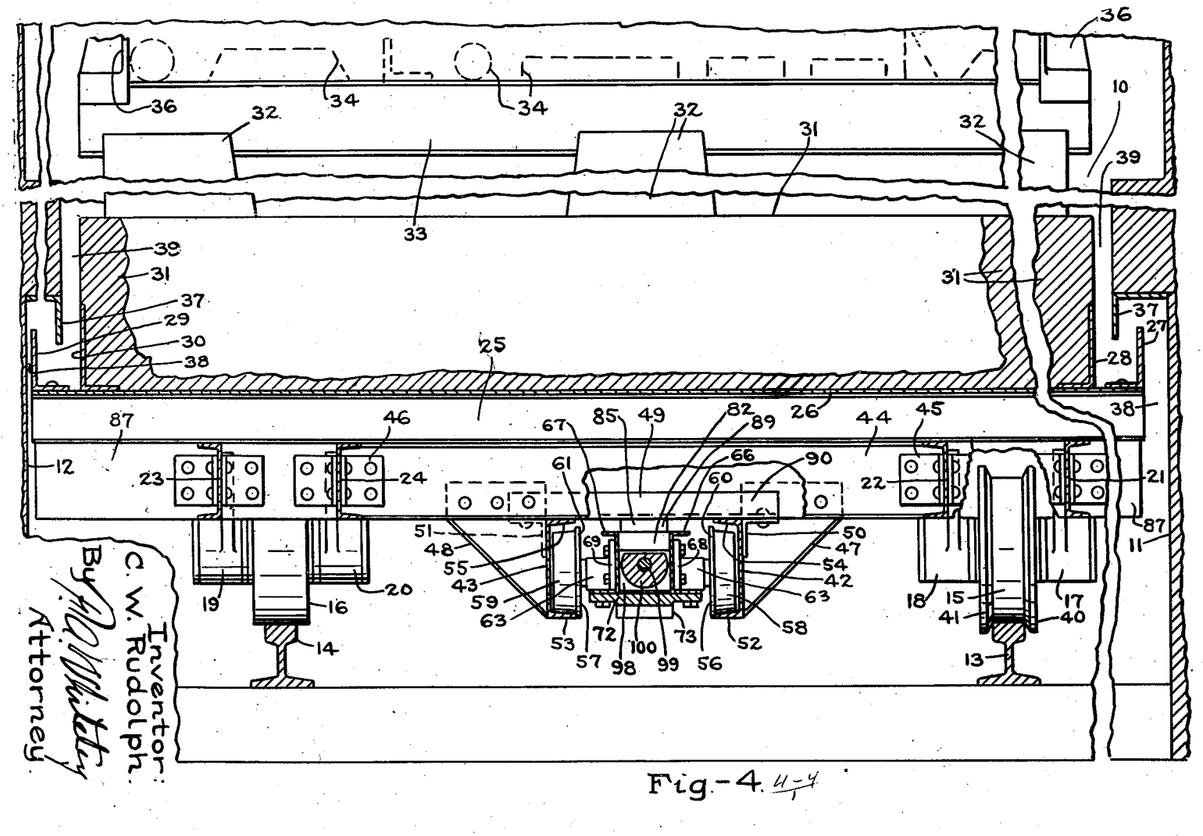
Fig. 4 is a transverse sectional view taken on line 4—4 of Fig. 1 when the truck has been moved to the inside of the furnace.

As illustrated herein and referring to Fig. 4, the door opening 10 leading to a heated chamber between side walls 11 and 12 of a furnace structure may have door means, not shown, for opening and closing the same. A pair of rails 13 and 14 of any customary form has mounted to roll thereon a multiplicity of pairs of wheels 15 and 16, Fig. 4, which are carried by pairs of journal blocks 17, 18 and 19, 20. As shown in Fig. 1, a considerable number of the pairs of supporting wheels 15 and 16 are employed. Upon the bearings 17, 18 and 19, 20 are mounted longitudinal frame pieces 21, 22 and 23, 24. Upon the longitudinal beams 21, 22 and 23, 24, which may be channel-beams as shown, or I-beams or other shapes as desired, are mounted a multiplicity of transverse beams 25 of generally similar shapes. These beams 25 support a plate 26, Fig. 4, having secured thereto longitudinal angle irons 27, 28 and 29, 30, Fig. 4. Between the upstanding flanges of angle irons 28, 30, is a mass of insulating refractory material indicated at 31 on Figs. 1 and 4. Upon the refractory bed 31 is mounted a series of posts 32, also of refractory material, which carry transverse supports 33 upon which are placed, generally in spaced relation, the articles to be heat-treated as indicated in dotted lines at 34 on Fig. 4. Side posts 36 are provided which are adapted to restrain any members 34 from moving off of the supports 33. This comprises a material-carrying truck T.

As shown, the upstanding flanges of angle pieces 27, 29, when the whole material-carrying arrangement is inside the heat chamber 10, come between the furnace wall 11 and a flange 37 below a portion of the furnace wall 11, as shown in Fig. 4. The entire truck arrangement supported on wheels 15 and 16 is of such a width that the spaces 38 and 39 between the flanges 27 and 29 and inner edges 11 and 12 of the heat chamber are relatively small. These passages also are irregular and the overlapping of flanges 37, 27 and 37, 29, makes a tortuous passage so that a scarcely appreciable amount of heat will pass down below the insulating table 31 to the space at the bottom where the wheels and other parts of the long truck are located.

It will be noted that wheels 15 are provided with flanges 40 and 41 embracing the rail 13, which insures that the material-carrying truck will be held to move within the narrow limits for admitting the same through the opening into the furnace. It will be understood that the upper part of the chamber above the platform or table 25 is heated by means not shown and which form no part of this invention, to a suitable temperature in a customary manner.

Figure 10:
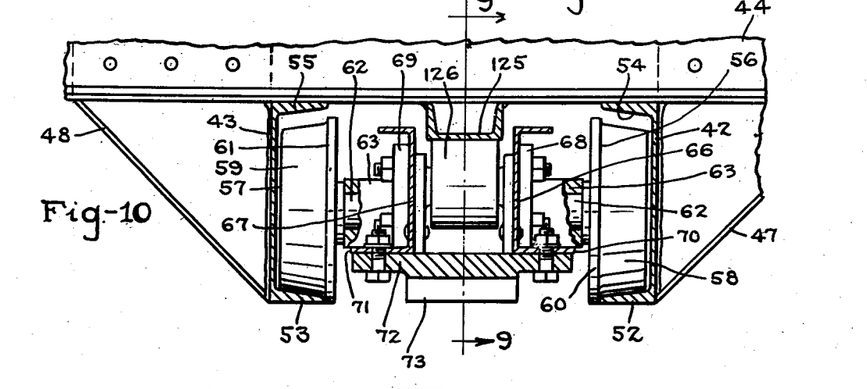
Fig. 10 is a transverse sectional view of the puller mechanism taken on line 10—10 of Fig. 9.
Figure 11:
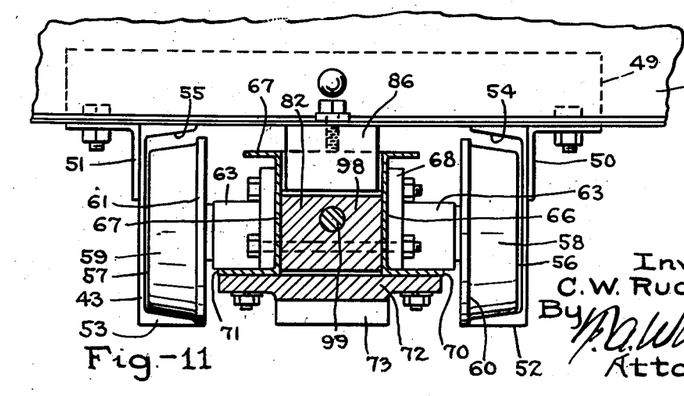
Fig. 11 is a similar transverse sectional view taken on line 11—11 of Fig. 6.

The means for moving the truck structure into and out of the heated chamber of the furnace room which form the main part of my invention herein described, are as follows: Referring to Figs. 4, 10 and 11, a pair of channel-beams 42 and 43 are suspended below the bottom planes of longitudinal members 21, 22, 23 and 24. These channel-beams are secured to transverse beam members 44 secured by angle plates 45 and 46 to the longitudinal members 22 and 24, respectively, Fig. 4, and also are securely braced by angle plates 47 and 48 which are secured to the channel-beams 42 and 43 at the sides thereof and to the web of the transverse member 44. An additional member 49, Fig. 4, is secured by angle pieces 50 and 51 (in dotted lines in Fig. 4) to further brace and strengthen the depending channel-beam frame members 42 and 43.

The flanges of the channel-beams 42, 43 are indicated at 52 and 53 as turned toward each other and are provided with angularly disposed surfaces 54 and 55. A pair of wheels 56 and 57 have their annular rims 58 and 59 beveled to the same angle as the faces 54 and 55 of the channel-beams 42 and 43, and are provided with flanges 61 and 62, respectively. The wheels 56 and 57 are mounted upon an axle 62 which is journaled in a heavy frame housing 63, Fig. 10, and the wheels are so held that the flanges 60 and 61 take just inside of the edges of the flanges 52 and 53 of channel-beam supports 42 and 43 so that the beveled wheel surfaces 58 and 59 will roll freely upon the correspondingly inclined faces of the channel flanges 52 and 53.

As shown in Fig. 1 at 64 and 65, there are two sets of wheels 56, 57, and supporting axle and framework 62 and 63. Obviously a greater or less number of such sets may be employed and secured together. In so securing the two sets of suspended truck wheels together a pair of specially constructed longitudinal beam members 66 and 67 have the vertical webs bolted to heavy plates 68 and 69 fast on the respective frame pieces 63 and extending on either side thereof to form a rigid elongated truck arrangement supported by the sets of wheels 56, 57.

Figures 6, 7, 8:
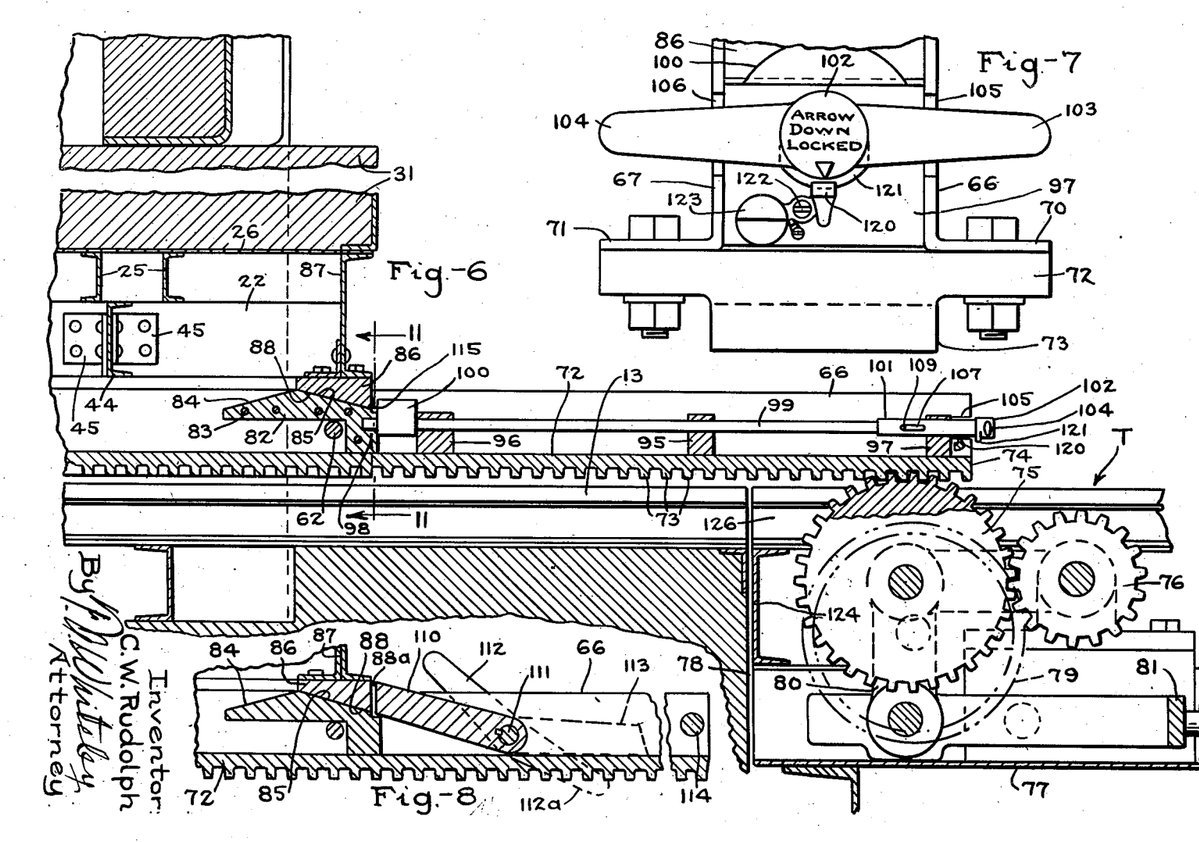
Fig. 6 is a view similar to Fig. 5, with the truck withdrawn from the furnace.
Fig. 7 is a detail view showing the controller shaft in locked position.
Fig. 8 is a sectional detail view of a modified form of cam construction.
Figure 9:
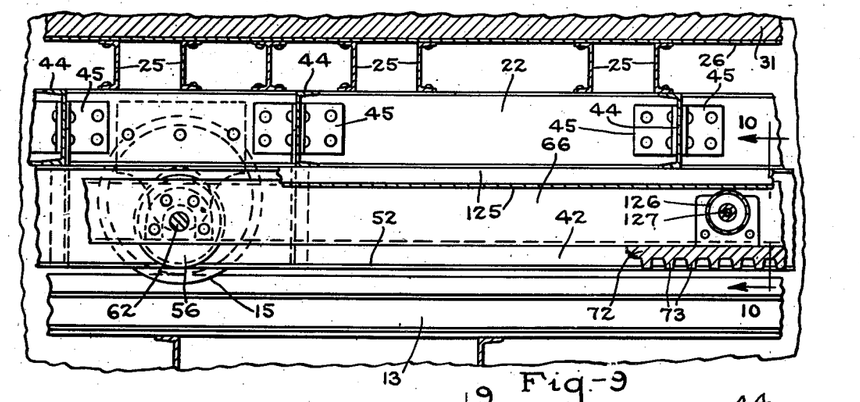
Fig. 9 is a longitudinal sectional view of a part of the mechanism taken on the line 9—9 of Fig. 10.

Upon the bottom flanges 70, 71 of the special channels 66, 67 is bolted a heavy bar 72 as shown in Figs. 4, 9 and 10, on which is formed the teeth 73 making up a rack bar 74, Fig. 6, extending the full length of the auxiliary carriage-supporting sets of wheels 56, 57. As clearly shown in Fig. 6, the teeth 73 mesh with the teeth of a gear 75 driven by a pinion 76 all supported by a framework 77 located in a pit 78. The pinion 76 is driven by any well known type of power means, such as an electric motor or other type of motor not shown.

In the moving of the floating truck carrying the rack bar 74 from its inoperative position within the frame of the material-carrying truck to its operative position for engagement by the spur gear 75, and in the reverse movement to return the floating truck and the rack bar carried thereby within the frame of the material-carrying truck, it is necessary that the spur gear 75 be mounted so that it may be moved out of the line of travel of the rack bar. In other words, the spur gear 75 is made movable to take it out of or into mesh with the rack bar 74. This important and necessary arrangement will now be described.

The spur gear 75 is carried by supporting bars or links 75' which are mounted to swing about the center of rotation of the pinion 76. Thus in the swinging movement of the spur gear 75 it will at all times remain in mesh with the driving pinion 76, so whether it is in its maximum elevated position for meshing with rack bar 74, or dropped to the dotted line position indicated at 79, Fig. 6, where its teeth are out of mesh with the teeth 73 of rack bar 74, it will none-the-less remain in mesh with the driving pinion 76.

The swinging movements up and down of the spur gear 75 and the links 75' carrying it, are effected by means of the link support 80 having its pivotal center at the center of rotation of spur gear 75, said link support being connected with a carriage 80' movable along horizontal ways in the framework 77. A pull device 81 connected with the carriage 80' may be pulled back and forth to move the carriage horizontally back and forth. This will have the effect of causing the spur gear 75 to swing around its pivot at the center of pinion 76 to drop down to the dotted line position at 79, Fig. 6.

When the reverse operation takes place and the carriage 80' is pushed horizontally in the opposite direction, the link support 80 will cause the spur gear 75 to be moved to swing about its center of support at center of pinion 76, continuously in mesh therewith, to the position at which the links 80 stand vertical and the spur gear 75 is brought into mesh with the teeth 73 of rack bar 74. In this position the tendency during driving operation to push the spur gear downwardly is effectively resisted by the link support 80 thrusting vertically upon the framework 77.

Figure 5:
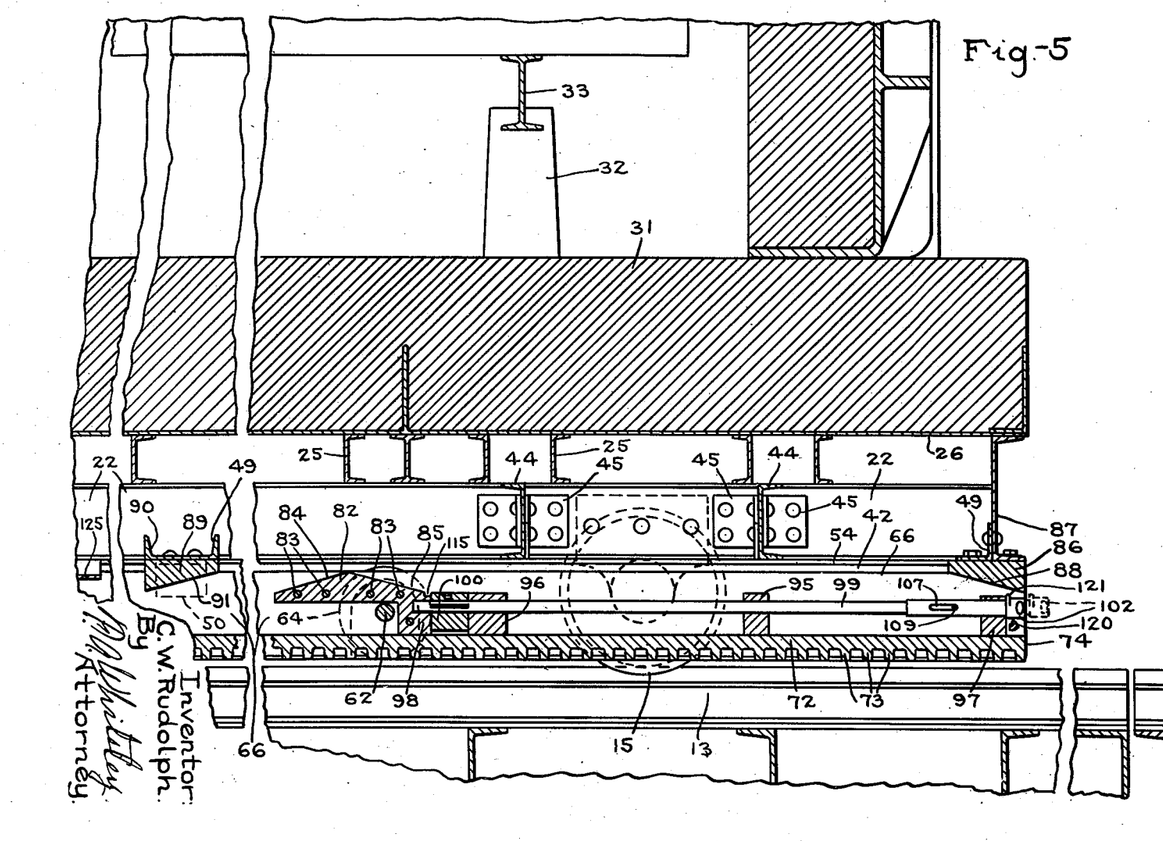
Fig. 5 is a longitudinal sectional view taken through the end of a portion of the end of the truck and controlling means taken through the cams and along the controller bar showing the parts as positioned in the furnace.

Referring now to Figs. 5 and 6. A block 82 is secured by transverse bolts 83 between the longitudinal channel pieces 66 and 67. The block 82 is provided with oppositely slanted beveled faces 84 and 85. A transverse wedge piece 86 is secured to a main frame channel 87 at the front of the truck, as indicated in Fig. 5, and is provided with a beveled face 88 having the same slant as the face 85 of piece 82. A second transverse member 89 carried by a channel 90 secured to the main transverse frame pieces 44 is provided with a beveled face 91 having the same slant as the beveled face 84 of the piece 82.

Thus when the face 85 of piece 82 is brought to contact face 88 of transverse member 86, as in Fig. 6, a draft connection is made between the main truck or material-carrying body and the inner supported truck member so that rack 74 will be projected a suitable distance, as indicated in Fig. 6, at the front of the material-carrying truck, and so that it may be engaged by the teeth of the spur gear 75 and withdrawn from the heated furnace, the pit containing the spur gear 75 and parts for driving it being located a suitable distance away from the front or door opening of the heat-treating chamber.

It is the means provided to project the rack bar a sufficient distance from the ends of the material-carrying truck so that the rack teeth 73 may be engaged by the spur gear 75 to move the material-carrying truck into and out of the heated furnace on the one hand, and to move it upon and from the transfer carriage on the other hand, which is the essential feature of my invention. The rack bar is adapted to be projected the predetermined requisite distance at either end of the material-carrying truck to effect these opposite movements. It will be understood that the material-carrying truck, like the furnaces into which it is adapted to be moved, may be of very great length, and for the purpose of providing uniform draft connection for this long and massive structure, additional transverse beveled face members 92 and 93 may be provided to engage opposite beveled faces 94 similar to those of the oppositely beveled faced pieces 82, as clearly indicated in Fig. 1. This arrangement is such that when the inner carriage is drawn out to the position of Fig. 6, (or to a similar position on the opposite end of the material-carrying truck), there will always be draft engagement between sets of beveled faces at two or more points.

For moving the material-carrying truck in the opposite direction the floating carriage and rack bar 74 will be projected to extend from the opposite end of the material-carrying truck. When this is done, the faces 84 and 91 will be brought into contact while at the same time corresponding faces 94 and 93 will be brought into contact. The draft from the part of rack bar 74 projected from the opposite end of the material-carrying truck will thus effect its movement in the opposite direction to bring it through the open door into the heat-treating chamber of the furnace. It follows that the rack bar 74 must be adapted to be driven by the spur gear 75 in both directions, in one direction being a pull-out draft bar and in the other direction being a push-in push bar. This makes necessary not only means manually operable to draw out the rack bar, as supported by the floating truck means above-described, but also in order to convert the rack bar into a push bar, to lock the rack bar for a backward thrust. The means for accomplishing this will now be described.

Journalled in blocks 95, 96 and 97, Fig. 5, and in the transverse portion 98 of the piece 82, is a longitudinally extended shaft 99. Eccentrically mounted at the inner end of this shaft and rigidly secured to it, is a thrust block 100. When the shaft 99 is turned so that the block 100 is down, the floating truck is free to be moved inwardly along and enclosed by the framework of the material-carrying truck, and may be so moved that face 84 may be brought into contact with face 91 when that is desired. But when the rack bar 74 has been projected its predetermined distance from either end of the material-carrying truck and it is desired to use the rack bar as a thrust bar, the eccentric piece 100 will be turned to cause a face to engage against a face of piece 96; then the material-carrying truck can be moved by thrust action of the spur gear 75 upon the rack bar 74, either to project it into the heat chamber or in the opposite direction to project it upon the transfer truck.

After this has been done (that is, after the material-carrying truck has been moved either into the furnace chamber or upon the transfer truck), the shaft 99 can be turned by hand means later to be described, and the floating truck and the parts carried by it can be pushed back by hand into the position of Fig. 5, where it will remain either until the heat-treatment has been completed, or until it has been transferred to other positions by means of the transfer truck later to be described.

Figures 2, 3:
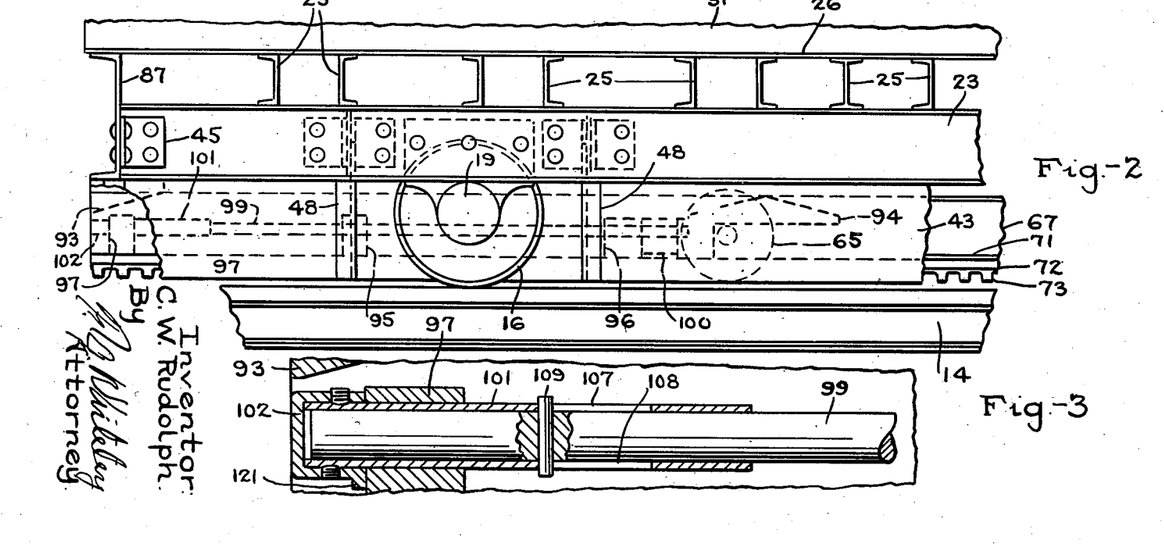
Fig. 2 is an enlarged side elevation view of a part of the inner end of the truck as shown in Fig. 1.
Fig. 3 is an enlarged sectional view of a portion of the puller bar for operating the cam directly.

For drawing the floating truck out by hand a sleeve 101 is mounted on the shaft 99, as best shown in Fig. 3. Secured to the end of the sleeve is a spanner cap 102 which is provided with oppositely extended arms 103 and 104. These arms are adapted to enter notches 105, 106, in the end of the frame pieces 66 and 67, Fig. 7. Oppositely disposed slots 107 and 108 receive the ends of a pin 109 set in the shaft 99, so that turning of the sleeve 101 will turn the shaft 99 and yet the sleeve 101 can be drawn out the distance permitted by slots 107, 108.

As indicated in Figs. 7 and 3, when the sleeve 101 is pushed in to bring the handles inside of the limits of the floating truck frame, a catch 120 comes over a lip 121 on the sleeve head 102. The catch is pivoted at 122 to the short arm of a counterbalance weight 123 which can be lifted by hand any time it is desired to release the sleeve to pull the handles out for operating the floating truck.

A modified method of locking the floating carriage and the rack bar 74 carried by it against the transverse wedge piece 86 is shown in Fig. 8. In this form a thrust lever 110 is carried by a shaft 111 which lies between and is journalled in the frame pieces 66, 67. A hand lever 112 will operate to draw the thrust lever 110 into the full line position of Fig. 8, where it will engage the front wall 88a of the piece 86 for a thrust contact to move the material-carrying truck in the direction away from the transfer truck 77. When the lever 112 is thrown back into the dotted line position indicated at 112a, Fig. 8, the thrust lever 110 will be leveled to bring it into the dotted line position indicated at 113 between the webs of the channels 66 and 67. In this form of the device the pull-out handle may be a transverse rod 114 mounted in the ends of webs of channels 66 and 67, which can be directly seized by the hands of the operator.

Figures 12, 13:
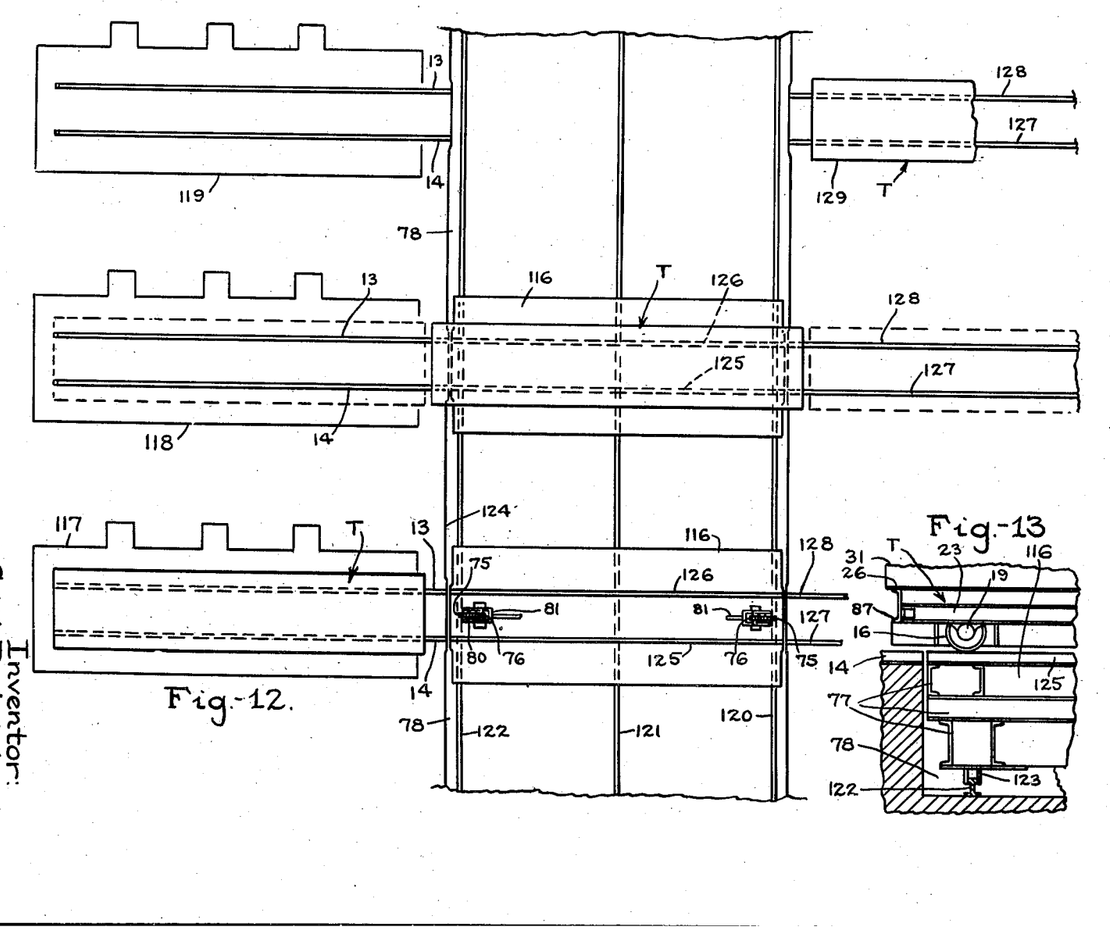
Fig. 12 is a plan view showing the manner in which my invention may be operated in receiving material-carrying trucks and transferring them for cooling, unloading and reloading, and for receiving and returning to the heated furnace chamber fresh loaded material-carrying trucks.
Fig. 13 is a small transverse sectional view across the transfer truck.

The operation and purposes of my invention are quite clearly indicated in Figs. 12 and 13, which show the relationship of the tracks leading into the chambers inside of the furnace structures, the material-carrying truck and the transfer carriage and tracks to which the material-carrying truck may be transferred.

As heretofore pointed out the driving gear 75 is mounted upon a framework 77 in a pit 78. The framework 77 as shown in Figs. 12 and 13, supports the body of a transfer truck 116. The pit 78 may be extended any desired distance. It will run transversely to the lengths of any desired number of furnace structures 117, 118 and 119. Along the bottom of pit 78 are a series of rails 120, 121 and 122, and these rails are engaged by flanged rollers 123 by means of which the truck bodies 116 are moved along the pit in either direction, preferably by power means, not shown, mounted on the truck bodies. The rails 13 and 14, Fig. 12, run to the edge 124 of pit 78. There their top surfaces lie in a horizontal plane which also meets the top surfaces of rails 125 and 126 extending along the transfer truck 116 across the pit 78. When, therefore, the transfer truck 116 is brought into position so that the rails 125, 126 thereon are in alignment with the rails 13 and 14, a material-carrying truck thereon as shown at the middle of Fig. 12 is in position to be driven into the chamber of a furnace such as furnace 118.

As already noted, the gearing shown in Fig. 6, is directly mounted upon the transfer truck T, so that when the transfer truck and material-carrying truck thereon is brought into the position above indicated, the roller truck on the material-carrying truck can be drawn out to its fully extended position, the spur gear 75 be thrown into operative mesh with the rack 74 and the material-carrying truck be driven through the open door into the furnace as indicated in Fig. 6, after which the roller truck can be restored to its position within the frame of the material-carrying truck where the rack will be entirely away from in front of the furnace structure 118.

On the opposite side of the pit 78 are other track members 127 and 128 which may extend away from the furnace structure any requisite distance and which are in the same horizontal plane and in alignment with the tracks 13 and 14 going into the chambers of furnace 117 to 119. When it is desired to transfer a material-carrying truck from off the transfer truck 116, as indicated at 129 on Fig. 12, the roller truck will be drawn out with its rack extending from the other end of the material-carrying truck 116 and may be operated as a thrust member to transfer the material-carrying truck to any one of the sets of rails 127, 128 and after such transfer has been effected the roller truck will again be restored to its position within the framework of the material-carrying truck.

The operation of my invention has been given quite fully heretofore. By means of the floating truck adapted to be moved along the frame of the material-carrying truck the rack is projected a suitable distance in advance of the latter which will be caused to engage the driven spur gear located at a point sufficiently removed from the opening into the heat-treating furnace and the material-carrying truck massive as it is with its load upon it, can then be withdrawn and moved as desired outside of the furnace. The same arrangement by means of the thrust members 110 and 100 permits the driven gear to move the material-carrying truck to its final position within the heat-treating chamber. A slight amount of play indicated at 115, Fig. 6, between the thrust block 100 and the transverse piece 86 will under normal conditions permit the rack to move back a sufficient distance after the material-carrying truck has been moved fully into the heat-treating chamber to permit the teeth of the spur gear 75 to engage the first teeth 73 of the rack bar 74.

Hence the action of the spur gear 75 upon the rack 74 might have a tendency to lift the floating truck or its wheels off of their guides and I provide a track bar 125, Figs. 9 and 10, which is engaged by a roller 126 journalled on a shaft 127 which extends between the longitudinal framework channel 66 and 67. This roller contacting the track member 25 offsets any tendency of the gear action on the rack to put a lifting strain on the floating truck.

The advantages of my invention have been pointed out in the preceding specification in connection with the description of the operation of the device. The primary advantage is in providing a safe and sure means of extending draft connection with the power means to a suitable distance away from the opening into the heated treating chamber. This is particularly effective where the draft means (it is also a pushing means) is a rack connected with a driven gear.

It will thus be apparent that a number of material-carrying trucks can be used simultaneously in different furnaces on different storage tracks and in transit for transferring to furnace chambers or to the storage tracks. Thus while one set of material-carrying trucks have brought their load of articles to be treated into the heat-treating chamber of the furnace, and while this treatment is going on, other material-carrying trucks will be loading and the process in the several furnace structures may be made substantially continuous.

I claim:

1. In a material-supporting truck adapted to be moved into and from a heated chamber of a furnace, a power means outside of the furnace embodying a constantly driven member, a floating truck mounted to move along the frame of the material-carrying truck, a draft member carried by said floating truck and adapted to be moved therewith from the body of the material-carrying truck to make draft connection with the constantly driven member, and means for locking the floating truck to the material carrying truck.

2. In a material-supporting truck adapted to be moved into and from a heated chamber of a furnace, a power means outside of the furnace embodying a constantly driven member, rails formed on the lower part of the material-supporting truck, a floating truck mounted to move along said rails, a draft member carried by said floating truck and adapted to be drawn therewith from the body of the material-carrying truck to make draft connection with the constantly driven member, and means for locking the floating truck to the material carrying truck.

3. In a material-supporting truck adapted to be moved into and from a heated chamber of a furnace, a power means outside of the furnace embodying a constantly driven gear, a floating truck mounted to move along the frame of the material-carrying truck, an elongated rack carried by said floating truck and adapted to be moved therewith from the body of the material-carrying truck, means to cause the constantly driven gear to engage the rack for moving the material-carrying truck, and means for locking the floating truck to the material carrying truck.

4. In a material-supporting truck adapted to be moved into and from a heated chamber of a furnace, a power means outside of the furnace embodying a constantly driven gear, a floating truck mounted to move along the frame of the material-carrying truck, an elongated rack carried by said floating truck and adapted to be moved therewith from the body of the material-carrying truck, contact members on the floating truck and the frame of the material-carrying truck respectively for effecting draft connection between the two trucks when the floating truck has been moved to extend the rack a predetermined distance, and means to cause the constantly driven gear to engage the rack for moving the material-carrying truck.

5. In a material-supporting truck adapted to be moved into and from a heated chamber of a furnace, a power means outside of the furnace embodying a constantly driven gear, a floating truck mounted to move along the frame of the material-carrying truck, an elongated rack carried by said floating truck and adapted to be moved therewith from the body of the material-carrying truck, a wedge block on the floating truck and a corresponding wedge block on the frame of the material-carrying truck adapted to be engaged for making draft connection between the two trucks when the rack has been extended from the material-supporting truck a predetermined distance, and means to cause the constantly driven gear to engage the rack for moving the material-carrying truck.

6. In a material-carrying truck adapted to be moved into and from a heated furnace, a floating truck mounted to move along the frame of the material-carrying truck, a draft member carried by said floating truck and adapted to be moved therewith from the body of the material-carrying truck a predetermined distance, and contact members on the floating truck and the frame of the material-carrying truck respectively for effecting draft connection between the two trucks when the floating truck has been moved to extend the rack a predetermined distance.

7. In a material-carrying truck adapted to be moved into and from a heated furnace, a floating truck mounted to move along the frame of the material-carrying truck, a draft member carried by said floating truck and adapted to be moved therewith from the body of the material-carrying truck a predetermined distance, contact members on the floating truck and the frame of the material-carrying truck respectively, and manually operable means for moving the floating truck on the frame to bring said contact members into engagement for effecting draft connection between the floating truck and the material-carrying truck.

8. In a material-carrying truck adapted to be moved into and from a heated furnace, a floating truck mounted to move along the frame of the material-carrying truck, a draft member carried by said floating truck and adapted to be moved therewith from the body of the material-carrying truck a predetermined distance, contact members on the floating truck and the frame of the material-carrying truck respectively, manually operable means for moving the floating truck on the frame to bring said contact members into engagement for effecting draft connection between the floating truck and the material-carrying truck for moving the latter in one direction, and means on said manually operative means for effecting such draft connection when said last-named means is operated for movement of the material-carrying truck in the opposite direction.

9. In a material-carrying truck adapted to be moved into and from a heated furnace, a floating truck mounted to move along the frame of the material-carrying truck, a draft member carried by said floating truck and adapted to be moved therewith to extend from the body of the material-carrying truck a predetermined distance, a contact member on said material-carrying truck, and a contact member on the floating truck, said members having faces adapted to engage when the floating truck has been moved along said frame a predetermined distance for effecting draft connection between the material-carrying truck and the draft member.

10. In a material-carrying truck adapted to be moved into and from a heated furnace, a floating truck mounted to move along the frame of the material-carrying truck, a draft member carried by said floating truck and adapted to be moved therewith from the body of the material-carrying truck a predetermined distance, a contact member on said material-carrying truck, a contact member on the floating truck, said members having faces adapted to engage when the floating truck has been moved along said frame a predetermined distance, a thrust block on said floating truck, and means to position the thrust block back of the contact member on the material-carrying truck for effecting thrust connection between the two when the floating truck has been moved to extend the rack a predetermined distance.

11. In a material-carrying truck adapted to be moved into and from a heated furnace, a floating truck mounted to move along the frame of the material-carrying truck, a draft member carried by said floating truck and adapted to be moved therewith to extend from the body of the material-carrying truck a predetermined distance, a contact member on said material-carrying truck, and a contact member on the floating truck, the first-named contact member having an upwardly sloping beveled face and the second-named contact member a downwardly sloping beveled face, said faces having the same slope and being adapted to engage when the floating truck has been moved along said frame a predetermined distance for effecting draft connection between the material-carrying truck and the draft member.

CHARLES W. RUDOLPH.